United States Patent [19]

Gavriles et al.

[11] Patent Number: 4,913,671

[45] Date of Patent: Apr. 3, 1990

[54] MARINE DRIVE WITH LUBRICATED OUTPUT COUPLER

[75] Inventors: James N. Gavriles, Oshkosh; Ronald E. Lowe, Fond du Lac, both of Wis.

[73] Assignee: Brunswick Corporation, Skokie, Ill.

[21] Appl. No.: 178,456

[22] Filed: Apr. 7, 1988

[51] Int. Cl.$^4$ .......................................... B63H 23/00
[52] U.S. Cl. ..................................... 440/83; 464/16; 440/111; 403/37
[58] Field of Search ................ 440/83, 111, 112, 113, 440/52, 64; 464/16, 92; 403/37, 39, 359; 184/5, 105.3, 28

[56] References Cited

U.S. PATENT DOCUMENTS

| | | | |
|---|---|---|---|
| 1,973,702 | 9/1934 | Cooke | 464/16 |
| 2,116,290 | 5/1938 | Spicer | 464/16 |
| 3,136,281 | 6/1964 | Kiekhaefer | 440/111 |
| 3,242,695 | 3/1966 | Ross, Jr. | 464/16 |
| 4,634,391 | 1/1987 | Entringer et al. | 440/75 |

*Primary Examiner*—Joseph F. Peters, Jr.
*Assistant Examiner*—Edwin Swinehart
*Attorney, Agent, or Firm*—Andrus, Sceales, Starke & Sawall

[57] ABSTRACT

A marine stern drive (10) has an engine output coupler with a coupler hub (56) having an axially splined opening (58) receiving the forward splined end (28) of the output drive shaft (24). The coupler hub has a pair of axial channel passages (60, 62) therein spaced radially outwardly of the splines (58), radial channel passages (64-69) extending radially inwardly from the axial channel passages, and inner circumferential channel passages (70, 72, 74) extending circumferentially around the axial splined opening in the coupler hub and intersecting the splines (59), A grease fitting (76) on the coupler hub communicates with one of the axial channel passages such that grease introduced at the fitting flows through the axial channel passages, through the radial channel passages, and through the circumferential channel passages, to lubricate the splines of the coupler hub and the output drive shaft.

6 Claims, 2 Drawing Sheets

MARINE DRIVE WITH LUBRICATED OUTPUT COUPLER

BACKGROUND AND SUMMARY

The invention relates to marine stern drives, and more particularly to the output coupler therefor.

A marine stern drive has a lower outboard gearcase having a vertical drive shaft driving a horizontal propeller shaft in a lower torpedo housing, a propeller mounted on the propeller shaft and driven thereby, a universal joint driving the vertical drive shaft at the top of the gearcase, an output drive shaft driving the universal joint and extending through the transom of a boat and having a forward splined end. An engine output coupler has an axially splined opening therein receiving the forward splined end of the output drive shaft. This structure has been subject to spline wear on commercial fishing boat engines due to lack of lubrication and continuous low speed operation.

The present invention addresses and solves the above noted problem in a particularly simple and effective manner. Grease passage structure is provided for lubricating the coupler and output drive shaft splines.

BRIEF DESCRIPTION OF THE DRAWINGS

Prior Art

Present Invention

Figure 3:
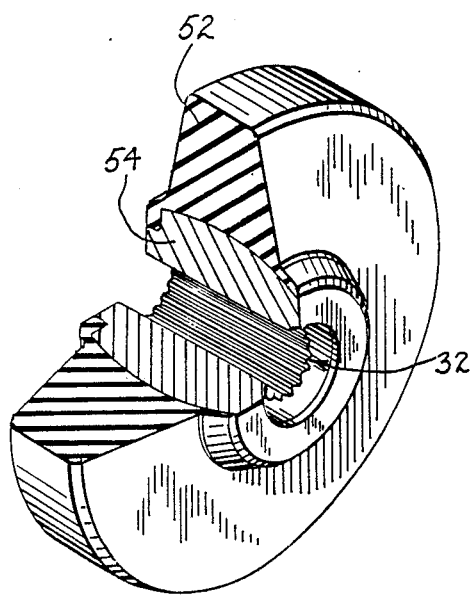
FIG. 3 is a perspective view partially cut away of part of the coupler of FIG. 2.
Figure 4:
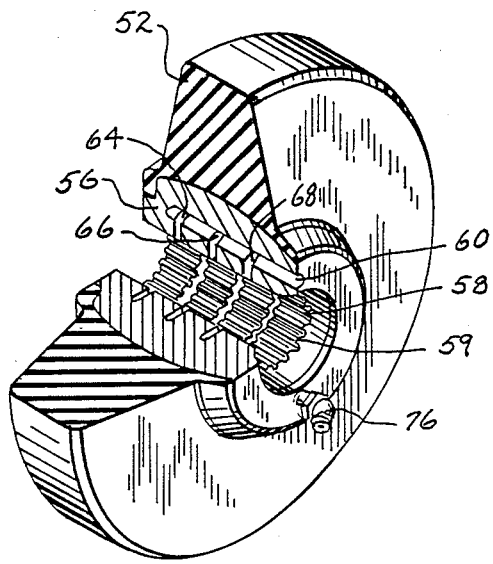

FIG. 4 is a view like FIG. 3 but showing a coupler in accordance with the invention.

Figure 5:
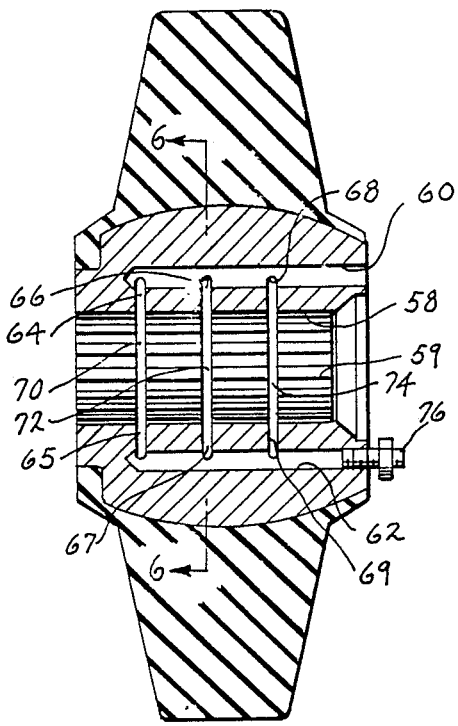

FIG. 5 is a sectional view of the coupler of FIG. 4.

Figure 6:
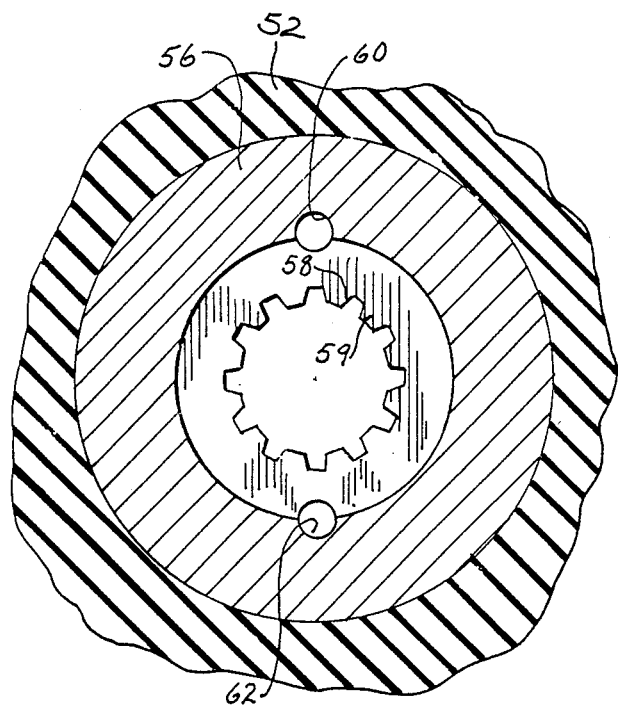

FIG. 6 is a sectional view taken along line 6—6 of FIG. 5.

DETAILED DESCRIPTION

Prior Art

Figure 1:
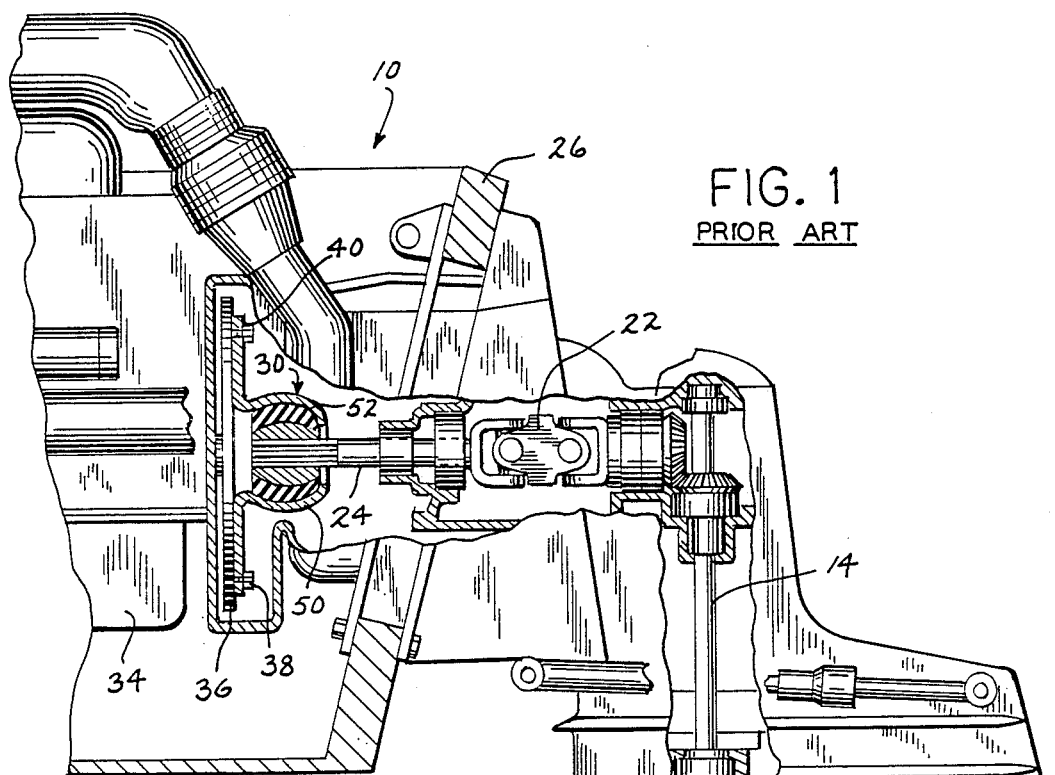
FIG. 1 is a side view partially in section of a marine stern drive known in the prior art.

FIG. 1 shows a marine stern drive 10 including a lower outboard gearcase 12 having a vertical drive shaft 14 driving a horizontal propeller shaft 16 in a lower torpedo housing 18, and having a propeller 20 mounted on propeller shaft 16 and driven thereby. A universal joint 22 drives the vertical drive shaft at the top of the gearcase, and an output drive shaft 24 drives the universal joint and extends through the transom 26 of a boat. Output drive shaft 24 has a forward axially splined end 28, FIG. 2. An engine output coupler 30 has an axially splined opening 32 therein receiving forward splined end 28 of output drive shaft 24. Inboard internal combustion engine 34 has a flywheel 36 connected to coupler 30 by a plurality of peripheral bolts such as 38 and 40 around the circumference thereof. Engine 34 rotates flywheel 36 which drives and rotates coupler 30 to drive output shaft 24 to drive universal joint 22 to drive vertical drive shaft 14 to drive propeller shaft 16 to rotate propeller 20, all as is standard in the art.

Figure 2:
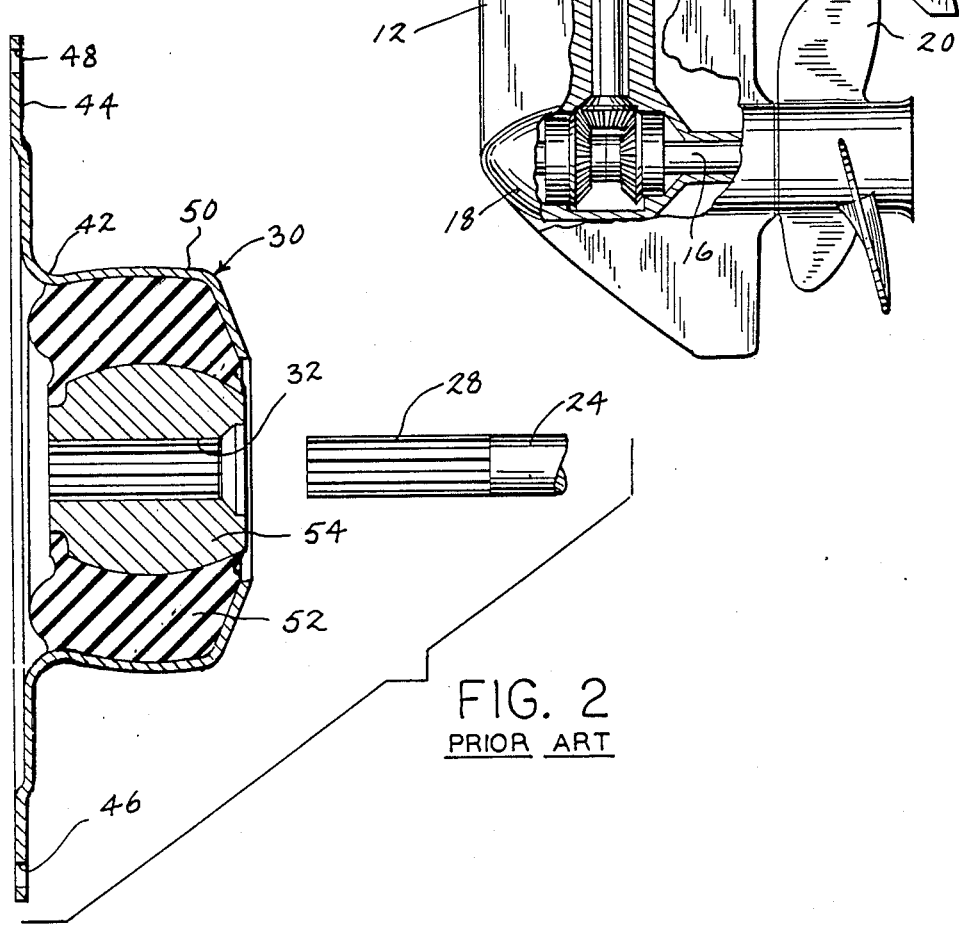
FIG. 2 is an enlarged view of a portion of FIG. 1 showing the output drive shaft separated from the output coupler.

Coupler 30 includes an outer metal housing 42 with a peripheral circumferential flange 44 having a plurality of spaced apertures such as 46 and 48 circumferentially therearound for receiving bolts such as 38 and 40, to bolt metal housing 42 to flywheel 36. Housing 42 has a central raised top-hat-like portion 50 (extending rightwardly in FIG. 2) receiving a rubber insert 52 therein. Insert 52 is shown in FIG. 3 in its pre-deformed condition prior to insertion into housing portion 50. Upon such insertion, insert 52 deforms to the shape shown in FIG. 2. Coupler 30 also includes a central metal hub 54 having central axially splined opening 32. Coupler hub 54 is snuggly gripped by rubber insert 52 therearound in FIG. 3, and is more tightly gripped upon deformation of rubber insert 52 upon insertion into housing portion 50 as shown in FIG. 2. Rubber insert 52 allows some resilient give and shock absorbing capability in the connection to propeller 20.

Present Invention

FIGS. 4–6 show an output coupler in accordance with the invention, and use like reference numerals from FIGS. 1–3 where appropriate to facilitate clarity. The coupler includes rubber insert 52 identical to that in FIGS. 1–3, and a metal hub 56 with a splined axial opening 58 receiving splined end 28 of output drive shaft 24. Coupler hub 56 has a pair of axial channel passages 60 and 62, FIGS. 5 and 6, spaced radially outwardly of splines 59 of opening 58. Coupler hub 56 has a plurality of radial channel passages 64, 65, 66, 67, 68, 69 extending radially inwardly from the axial channel passages. Coupler hub 56 has a plurality of inner circumferential channel passages 70, 72, 74 extending circumferentially around opening 58 and intersecting splines 59.

A grease fitting 76 is provided on coupler hub 56 communicating with axial channel passage 62 such that lubricating grease introduced at fitting 76 flows through axial channel passage 62 and through the radial channels passages 65, 67, 69 and through the circumferential channels passages 70, 72, 74, and through radial channels passages 64, 66, 68, and through axial channel passage 60. In this manner, the splines of coupler hub opening 58 and the splines of output drive shaft end 28 are lubricated. Axial passages 60 and 62 provide a reservoir for the grease. Passages 70, 72 and 74 extend in an arc circumferentially around opening 58 and perpendicularly intersect splines 59 for supplying grease thereto.

It is recognized that various equivalents, alternatives and modifications are possible within the scope of the appended claims.

We claim:

1. A marine drive having an engine output coupler driven to rotate about an axis and having a splined axial opening therein, an output drive shaft operatively coupled to a propeller for driving same and having a splined end received in said splined axial opening of said coupler, said coupler having a grease fitting for introducing grease therein and grease passages extending from said grease fitting and communicating with said splines to lubricate the latter, wherein said grease passages have a first portion extending axially in said coupler and spaced radially outwardly from said splines, and a second portion extending from said first portion radially inwardly to said splines.

2. The invention according to claim 1 wherein said grease passages have a third portion extending from said second portion in an arc around said splines and communicating therewith.

3. The invention according to claim 2 wherein said third portion of said grease passages intersects said splines.

4. The invention according to claim 3 wherein said third portion of said grease passages extend circumferentially around said axial opening in said coupler and perpendicularly intersect said splines.

5. The invention according to claim 3 comprising a plurality of said first portions cumulatively providing a reservoir for said grease.

6. A marine stern drive comprising a lower outboard gearcase having a vertical drive shaft driving a horizontal propeller shaft in a lower torpedo housing a propeller mounted on said propeller shaft and driven thereby, a universal joint driving said vertical drive shaft at the top of said gearcase, an output drive shaft driving said universal joint and extending through the transom of a boat and having a forward splined end, an engine output coupler having an axially splined opening therein receiving said forward splined end of said output drive shaft, said coupler having one or more axial channels therein spaced radially outwardly of said splines, said coupler having one or more radial channels extending radially inwardly from said one or more axial channels, said coupler having one or more inner circumferential channels extending circumferentially around said opening in said coupler and intersecting said splines, a grease fitting on said coupler communicating with one of said axial channels such that grease introduced at said fitting flows through said one axial channel and through said one or more radial channels and through said one or more circumferential channels, an inboard internal combustion engine having a flywheel connected to said coupler and driving the latter to drive said output drive shaft to drive said universal joint to drive said vertical drive shaft to drive said propeller shaft to rotate said propeller.

* * * * *